(12) United States Patent
Abdur-Rahim et al.

(10) Patent No.: US 9,347,430 B2
(45) Date of Patent: May 24, 2016

(54) ADAPTIVE PITCH CONTROL SYSTEM FOR WIND GENERATORS

(71) Applicant: KING FAHD UNIVERSITY OF PETROLEUM AND MINERALS, Dhahran (SA)

(72) Inventors: Abu Hamed Mohammed Abdur-Rahim, Dhahran (SA); Syed Ahmed Raza, Al-Khobar (SA)

(73) Assignee: KING FAHD UNIVERSITY OF PETROLEUM AND MINERALS, Riyadh (SA)

( * ) Notice: Subject to any disclaimer, the term of this patent is extended or adjusted under 35 U.S.C. 154(b) by 552 days.

(21) Appl. No.: 13/862,327

(22) Filed: Apr. 12, 2013

(65) Prior Publication Data

US 2014/0306451 A1 Oct. 16, 2014

(51) Int. Cl.
*G05D 11/00* (2006.01)
*F03D 7/02* (2006.01)

(52) U.S. Cl.
CPC .......... *F03D 7/0224* (2013.01); *F05B 2270/404* (2013.01); *F05B 2270/709* (2013.01); *Y02E 10/723* (2013.01)

(58) Field of Classification Search
CPC .......................... Y02E 10/723; F05B 2270/404
USPC .............................. 700/287, 289, 290; 290/44
See application file for complete search history.

(56) References Cited

U.S. PATENT DOCUMENTS

| | | | |
|---|---|---|---|
| 7,117,045 B2 * | 10/2006 | Hittle ................... | G05B 13/027 123/689 |
| 7,679,208 B1 * | 3/2010 | Ko ........................ | F03D 7/0224 290/44 |
| 7,705,481 B2 | 4/2010 | Kabatzke et al. | |
| 2010/0096854 A1 | 4/2010 | Paluszek et al. | |
| 2010/0127495 A1 | 5/2010 | Egedal et al. | |
| 2011/0004356 A1 | 1/2011 | Garcia | |
| 2011/0291414 A1 | 12/2011 | Arinaga et al. | |
| 2012/0165996 A1 | 6/2012 | Olesen | |
| 2013/0140819 A1 * | 6/2013 | Abdallah .............. | F03D 7/0224 290/44 |

FOREIGN PATENT DOCUMENTS

EP 2 541 052 A1 1/2013

* cited by examiner

*Primary Examiner* — Kenneth M Lo
*Assistant Examiner* — Chad Rapp
(74) *Attorney, Agent, or Firm* — Richard C. Litman (57) ABSTRACT

The adaptive pitch control system for wind generators is utilized in variable speed doubly fed induction generator (DFIG) systems. An adaptive neural network generates optimized controller gains for pitch control. The pitch controller parameters are generated using intelligent differential evolution, a type of genetic algorithm. A back propagation neural network is trained using the generated pitch controller parameters, thereby tuning the weights of the network according to the system states in a variable wind speed environment.

5 Claims, 6 Drawing Sheets

ADAPTIVE PITCH CONTROL SYSTEM FOR WIND GENERATORS

BACKGROUND OF THE INVENTION

1. Field of the Invention

The present invention relates to wind turbines, and particularly to an adaptive pitch control system for wind generators.

2. Description of the Related Art

Because of diminishing oil reserves and environmental concerns, renewable energy research is getting momentum. Wind energy in itself encompasses various engineering fields and is rapidly developing into a multi-disciplinary area of research and experimentation. In wind generation systems, the variable speed doubly fed induction generator (DFIG) is preferred over the permanent magnet synchronous generator (PMSG) type for its versatility.

The control of blade pitch angle is a necessary part of variable speed wind turbines, since by controlling the pitch angle, the aerodynamic power that flows through to the generator can be adjusted. The system dynamics relied upon in some installations use a PI controller. Many installations use Fuzzy logic to find the pitch controller parameters. A self-tuning fuzzy-PID controller has been described in the related art. Robust controllers for output power leveling of variable speed variable pitch wind turbine generator systems are also available in the literature. The use of generalized predictive control has also been reported. Moreover, the literature reports a neural network capable of self-tuning for different operating conditions.

Thus, an adaptive pitch control system for wind generators solving the aforementioned problems is desired.

SUMMARY OF THE INVENTION

The adaptive pitch control system for wind generators is utilized in variable speed doubly fed induction generator (DFIG) systems. An adaptive neural network generates optimized controller gains for pitch control. The pitch controller parameters are generated using intelligent differential evolution, a type of genetic algorithm. A back propagation neural network is trained using the generated pitch controller parameters, thereby tuning the weights of the network according to the system states in a variable wind speed environment.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

At the outset, it should be understood by one of ordinary skill in the art that embodiments of the present method can comprise software or firmware code executing on a computer, a microcontroller, a microprocessor, or a DSP processor; state machines implemented in application specific or programmable logic; or numerous other forms without departing from the spirit and scope of the method described herein. The present method can be provided as a computer program, which includes a non-transitory machine-readable medium having stored thereon instructions that can be used to program a computer (or other electronic devices) to perform a process according to the method. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions, but excludes intangible media or transient waveforms or signals.

The adaptive pitch control system for wind generators is utilized in variable speed doubly fed induction generator (DFIG) systems. An adaptive neural network generates optimized controller gains for pitch control. The pitch controller parameters are generated using intelligent differential evolution, a type of genetic algorithm. A back propagation neural network is trained using the generated pitch controller parameters, thereby tuning the weights of the network according to the system states in a variable wind speed environment. The controller parameters obtained by this process are optimized by minimizing or maximizing a particular cost function.

A proportional-integral (PI) controller is employed to generate the appropriate pitch angle for varying wind speed conditions. An artificial neural network (ANN) is trained to produce PI gain settings for various wind speed conditions. The training data is generated through differential evolution intelligent technique (DEIT). Simulation studies show that the DEIT-based ANN can generate the appropriate control to deliver the wind power to the generator efficiently with minimum transients.

Figure 1:
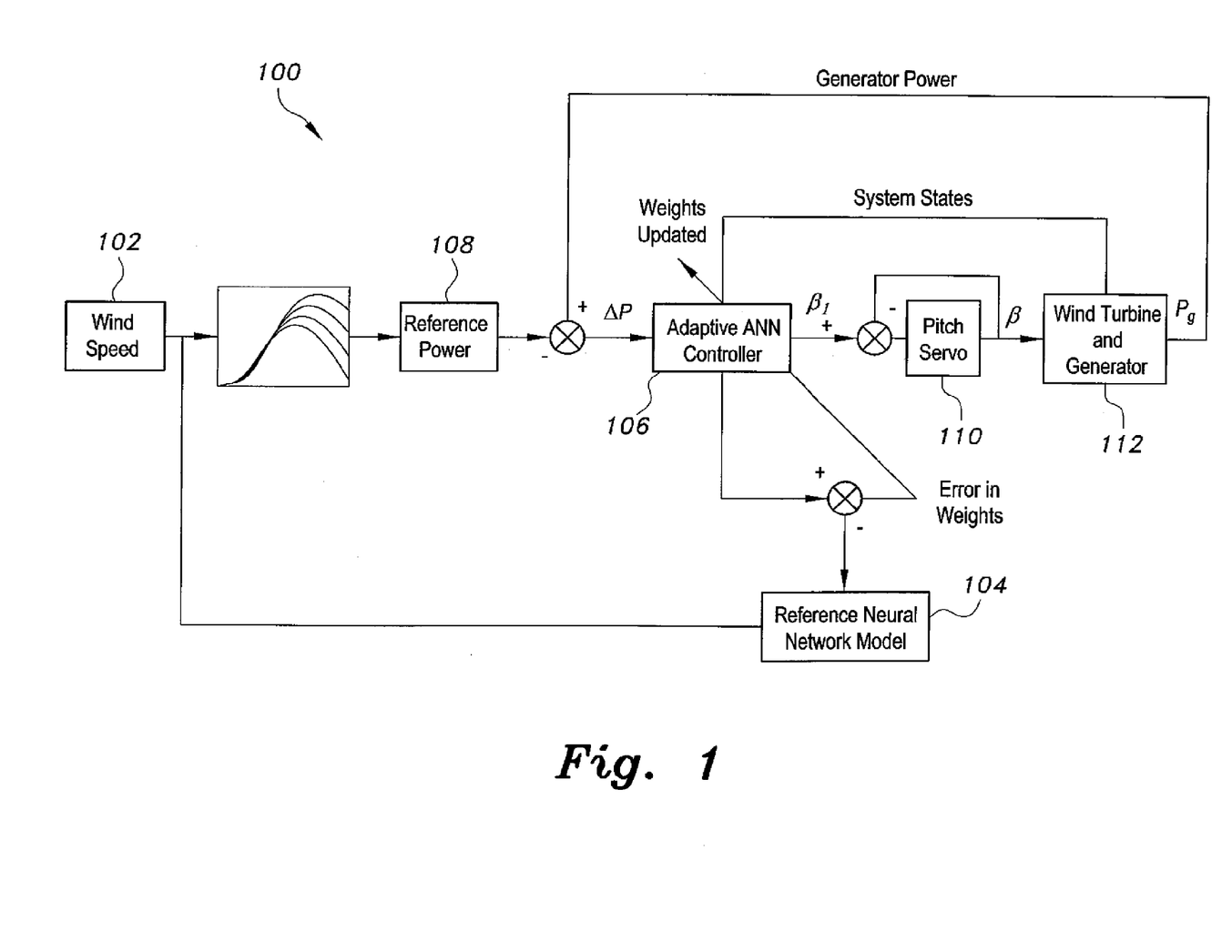
FIG. 1 is a block diagram of an adaptive pitch control system for wind generators according to the present invention that uses a neural network.

A schematic diagram of the DFIG system connected to the power grid equipped with the pitch control system 100 is shown in FIG. 1. The wind speed 102 is input to a table of curves representing mechanical power at a plurality of given pitch angles β vs. rotor speed to extract a theoretically maximum reference power 108. The wind speed 102 is also fed to a reference neural network model 104, which is used for parameter optimization in an adaptive artificial neural network (ANN) controller 106. The ANN controller 106 has an output, β, which is a rotor blade pitch angle command sent to the pitch servo 110. Closed-loop parameters of the wind turbine generator 112 and generator power output are fed back to the ANN 106.

Figure 2:
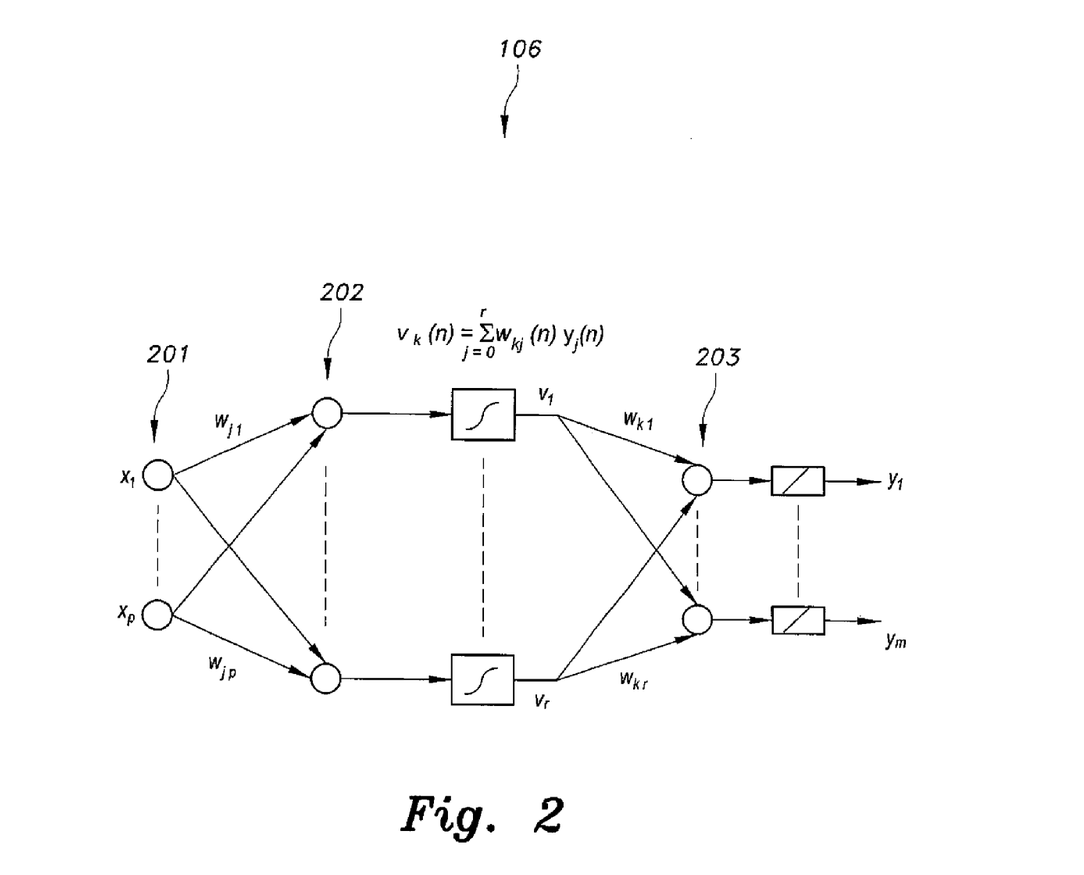
FIG. 2 is a block diagram of the back propagation neural network layout for the adaptive pitch control system for wind generators of FIG. 1.

FIG. 2 illustrates that the ANN 106 comprises a back propagation neural network (BPNN) having an input layer 201, at least one hidden layer 202, and an output layer 203. The activation for the artificial neurons is a logistic function.

The induction generator is driven by a horizontal-axis wind turbine through its gear boxes. The converters are located between the rotor terminals and the grid. The dynamic model of the system includes the wind turbine, the pitch controller, and the generator with its converters.

The amount of power extracted from wind is a function of air density and is given by:

$$P_m = \tfrac{1}{2}\rho\pi R^2 V_w^3 C_p(\lambda,\beta). \tag{1}$$

Here, $V_w$ is the wind velocity, R is the radius of the rotor blades, and $C_p(\lambda,\beta)$ is the coefficient that is dependent upon the tip speed ratio $\lambda$ and the pitch angle $\beta$. The coefficient $C_p$ denotes the power coefficient and is a non-linear function of $\lambda$ and $\beta$ given by:

$$C_p(\lambda, \beta) = .5176\left[\frac{116}{\lambda_i} - 0.4\beta - 5\right]e^{\frac{-21}{\lambda_i}} + 0.0068\lambda \tag{2}$$

$$\frac{1}{\lambda} = \frac{1}{\lambda + 0.08\beta} - \frac{.035}{\beta^3 + 1}.$$

The tip speed ratio is related to wind speed through:

$$\lambda = \frac{\omega_T R}{V_w}. \tag{3}$$

With respect to the induction generator model, in dynamic modeling, the DFIG is normally represented by a 4th order model of stator and rotor currents along the d-q (direct-quadrature) axes, which are given as $[i_{ds}\ i_{qs}\ i_{dr}\ i_{qr}]$. These equations are dependent on generator slip. The converter dynamic model is normally represented by a second order model containing d-q components of converter currents $[i_{ad}\ i_{aq}]$ and the converter DC capacitor voltage $V_c$. The drive train model consists of the high inertia turbine coupled to a relatively lower inertia generator, and is expressed in terms of a third-order model with states $[\omega_r, \omega_g, \theta_s]$, which are turbine and generator speeds, and torsion angle, respectively.

Regarding pitch angle control, as can be observed from equations (1) and (2), control of the pitch angle $\beta$ provides an effective means for controlling the power input to the generator under varying wind speeds. To put the blades into the necessary position, pitch servos are employed, which may be hydraulic or electrical systems.

Conventional pitch angle control uses generator rotor speed error to drive a PI controller to generate an appropriate $\beta$, while a more popular method is to compare the available power from the wind with actual generator power. FIG. 2 shows the pitch angle controller configuration. A PI controller is used as pitch controller. The composite model of the system, including the PI controller, is written as:

$$\dot{x} = [x, u] \tag{4}$$

where, $\dot{x}$ is the vector of the states $[i_{ds}\ i_{qs}\ i_{dr}\ i_{qr}\ \omega_r, \omega_g, \theta_s V_c i_{ad} i_{aq} \beta_s]$ and u is the pitch control. In the present system, the gains of the PI controller are obtained from a trained artificial neural network (ANN). Wind data for the training may be collected from any suitable installation, e.g., the 5-kW wind system installed at the King Fahd University beach front. Training data is generated by a differential evolution intelligent technique. A brief outline of the ANN and DEIT procedures are given in the following.

Figure 3:
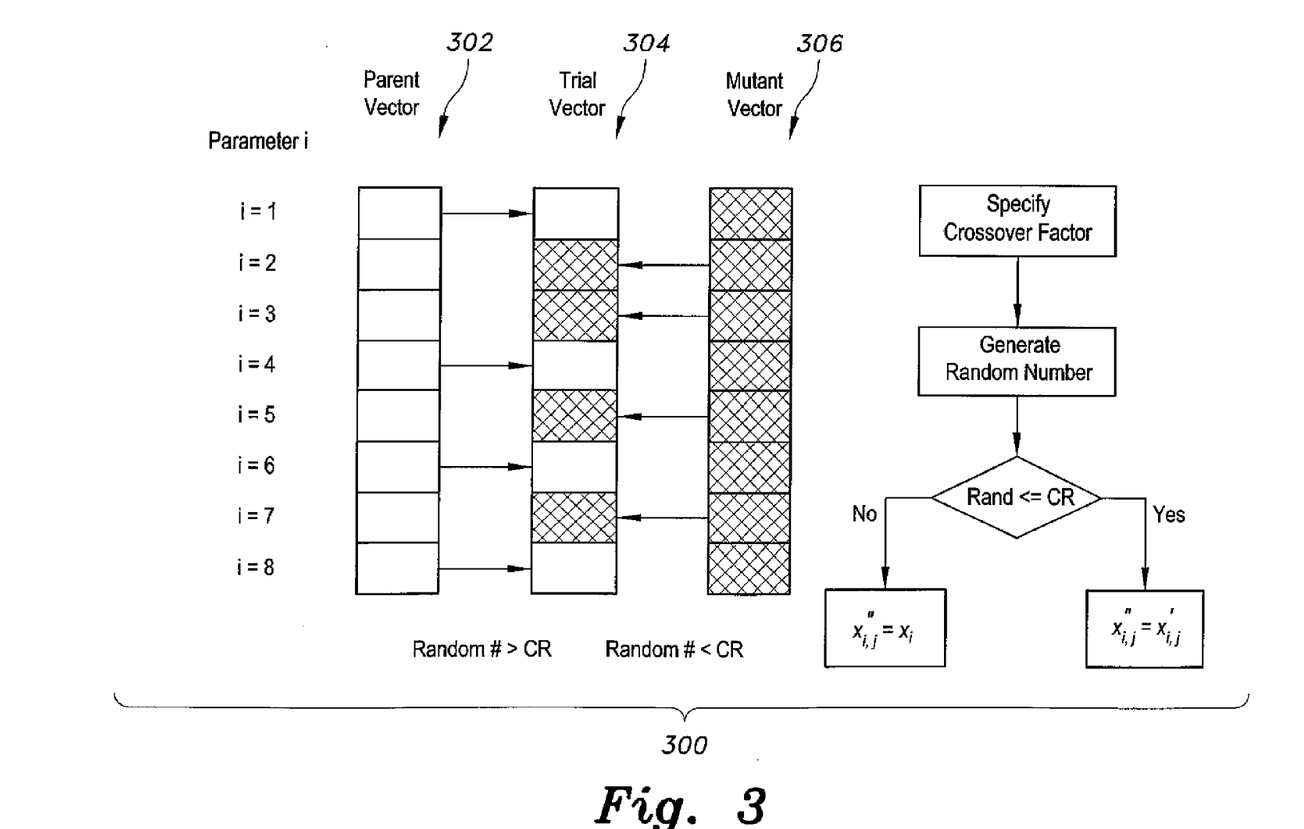
FIG. 3 is a block diagram and flowchart showing the crossover process of the differential evolution intelligent algorithm for the adaptive pitch control system for wind generators of FIG. 1.

As shown in FIG. 3, the present system and method utilizes a three-layer perceptron Back-propagation Neural Network comprising input, hidden, and output layers and activation functions in the hidden and output layers. The number of neurons in these layers is assumed to be p, r and m, respectively. The training starts by arbitrarily assuming weighting function $w_{ji}$ and the signals at the hidden and output layers are computed as:

$$v_{jn}(n) = \sum_{i=0}^{p} w_{ji}(n)x_i(n) \tag{5}$$

$$y_j(n) = \varphi_j(v_j(n))$$

Here, $\phi_j$ is a logistic activation function of the sigmoid type. For neuron k at the output layer, the net internal activity level is:

$$v_k(n) = \sum_{j=0}^{r} w_{kj}(n)y_j(n) \tag{6}$$

In the training process, the network is presented with a pair of patterns, including an input pattern and a corresponding desired output pattern. In the back-propagation algorithm, there are two distinct passes of computation. In the forward pass, the outputs are computed on the basis of selected weights, and the error $e_k(n) = d_k(n) - \mu_k(v_k(n))$ is computed. In the backward pass, the weights are updated in order to minimize the sum of the squares of errors:

$$E_{av} = \frac{1}{2}\sum_{k=1}^{m} e_k^2.$$

The synaptic weight $w_{ji}$ at any layer 1 is updated through the steepest descent technique. The solution is accelerated through a proper choice of momentum constant $\alpha$ and learning rate parameter $\eta$, and is finally expressed as;

$$w_{ji}(n+1) = w_{ji}(n) + \alpha[w_{ji}(n) - w_{ji}(n-1)] + \eta\delta_j(n)y_i^{l-1}(n), \tag{7}$$

where $$\delta_j(n) = \dot{\varphi}(v_j(n))\sum_k \delta_k^{l+1}(n)w_{kj}^{l+1}(n). \tag{8}$$

In the pitch control algorithm, the input to the network is the set of wind speeds collected for a sample time, and the output trained variables are the controller gains, which are determined utilizing a differential evolution intelligent search algorithm that finds the optimum value of an objective function subject to satisfying the system constraints.

In step A, the DEIT procedure defines the dimension of the problem. Since in this case the control variables are, $K_p$ and $K_I$, the dimension is 2. Also, the procedure sets the maximum and minimum range of the variables.

In step B, within the upper and lower bounds for $K_P$ and $K_I$, the population members are created through the relation:

$$x_{ij} = x_{j,min}(n) + \text{rand}(0,1)(x_{j,max} - x_{x,min})\ i=1,NP,j=1,D. \tag{9}$$

Here, NP=100, D=2 and rand(0,1) is a random number selected between 0 and 1.

In step C, to change each member of the target generation $X_i^{(G)}$, a donor vector $V_i^{(G+1)}$ is produced and given by mutation as:

$$V_i^{(G+1)} = X_{r1}^{(G)} + F(X_{r2}^{(G)} - X_{r3}^{(G)}). \tag{10}$$

where $X_{r1}^{(G)}, X_{r2}^{(G)}$ and $X_{r3}^{(G)}$ are randomly selected solution vectors from the target generation, and F is the mutation factor.

In step D, to enhance the diversity, a binomial type crossover is applied on each variable, the crossover defined by:

$$\begin{bmatrix} \Delta i_{ds} \\ \Delta i_{qs} \\ \Delta i_{dr} \\ \Delta i_{qr} \\ \Delta \dot{\omega}_t \\ \Delta \dot{\omega}_g \\ \Delta \dot{\theta}_s \\ \Delta i_{ad} \\ \Delta i_{aq} \\ \Delta \dot{V}_c \\ \Delta \dot{\beta}_i \\ \Delta \dot{\beta} \end{bmatrix} = \begin{bmatrix} a_{1,1} & a_{1,2} & a_{1,3} & a_{1,4} & 0 & a_{1,6} & 0 & a_{1,8} & a_{1,9} & a_{1,10} & 0 & 0 \\ a_{2,1} & a_{2,2} & a_{2,3} & a_{2,4} & 0 & a_{2,6} & 0 & a_{2,8} & a_{2,9} & a_{2,10} & 0 & 0 \\ a_{3,1} & a_{3,2} & a_{3,3} & a_{3,4} & 0 & a_{3,6} & 0 & a_{3,8} & a_{3,9} & a_{3,10} & 0 & 0 \\ a_{4,1} & a_{4,2} & a_{4,3} & a_{4,4} & 0 & a_{4,6} & 0 & a_{4,8} & a_{4,9} & a_{4,10} & 0 & 0 \\ 0 & 0 & 0 & 0 & a_{5,5} & 0 & a_{5,7} & 0 & 0 & 0 & 0 & a_{5,12} \\ a_{6,1} & a_{6,2} & a_{6,3} & a_{6,4} & 0 & 0 & a_{6,7} & 0 & 0 & 0 & 0 & 0 \\ 0 & 0 & 0 & 0 & a_{7,5} & a_{7,6} & 0 & 0 & 0 & 0 & 0 & 0 \\ a_{8,1} & a_{8,2} & 0 & 0 & 0 & 0 & 0 & a_{8,8} & a_{8,9} & a_{8,10} & 0 & 0 \\ a_{9,1} & a_{9,2} & 0 & 0 & 0 & 0 & 0 & a_{9,8} & a_{9,9} & a_{9,10} & 0 & 0 \\ 0 & 0 & a_{10,3} & a_{10,4} & 0 & 0 & 0 & a_{10,8} & a_{10,9} & 0 & 0 & 0 \\ a_{11,1} & a_{11,2} & a_{11,3} & a_{11,4} & 0 & 0 & 0 & 0 & 0 & 0 & 0 & 0 \\ a_{12,1} & a_{12,2} & a_{12,3} & a_{12,4} & 0 & 0 & 0 & 0 & 0 & 0 & a_{12,11} & a_{12,12} \end{bmatrix} \begin{bmatrix} \Delta i_{ds} \\ \Delta i_{qs} \\ \Delta i_{dr} \\ \Delta i_{qr} \\ \Delta \omega_t \\ \Delta \omega_g \\ \Delta \theta_s \\ \Delta i_{ad} \\ \Delta i_{aq} \\ \Delta V_c \\ \Delta \beta_i \\ \Delta \beta \end{bmatrix} \quad (13)$$

$$u_{i,j}^{(G)} = v_{i,j}^{(G)} \text{ if rand}(0,1) < CR; x_{i,j}^{(G)} \text{ otherwise.} \quad (11)$$

CR is the crossover factor, $u_{i,j}^{(G)}$, $v_{i,j}^{(G)}$ and $x_{i,j}^{(G)}$ are the $j^{th}$ components of the trail vector, donor vector and target vector, respectively, in the $i^{th}$ population members. As shown in FIG. 3, the crossover process 300 entails utilizing parameters to be evolved to form a parent vector 302, which is used to form a trial vector 304. Mutation produces a mutant vector 306, which then is folded back to complete the trial vector 304.

Step E keeps the generation size constant by selecting which vector is going to survive in the next generation using a Survival of the Fittest concept characterized by the relation:

$$X_i^{(G+1)} = U_i^{(G)} \text{ if } J(U_i^{(G)}) \leq X_i^{(G)}); X_i^{(G+1)} = X_i^{(G)} \text{ if } J(X_i^{(G)}) < U_i^{(G)}). \quad (12)$$

The function J is the objective function to be minimized, which is the difference in damping ratio obtained from the dominant eigenvalues of the linearized system of the original nonlinear equation (3). The vector $U_i^{(G)}$ is the current trial vector, and $X_i^{(G)}$ is the current target vector.

Conditional branching at step F picks the best solution, corresponding to the minimum value of the objective function. Steps 'A-E' are repeated to get the global best values of $K_P$ and $K_I$, or to stop and restart the procedure when the maximum number of iterations has been reached.

The pitch controller designed through the ANN and DEIT was tested for various wind speed conditions, including for wind speed variations from 12 m/s to 11 m/s, and 12 m/s to 14 m/s, respectively. According to the testing, the present DEIT-based ANN pitch controller transfers the wind power to the generator with minimum transients. The steady-state response is also very good.

Figure 4:
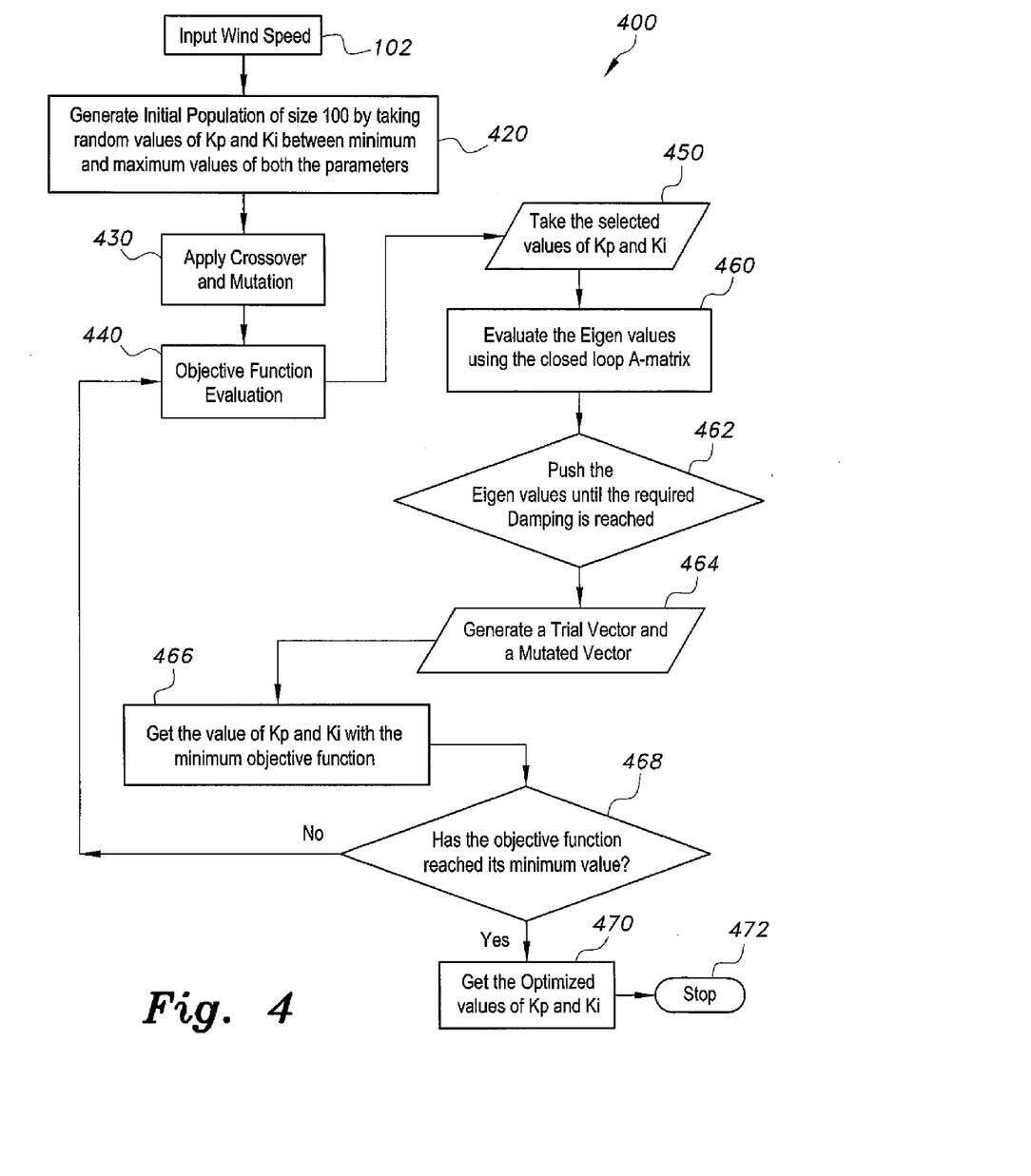
FIG. 4 is a detailed flowchart of the differential evolution intelligent algorithm for the adaptive pitch control system for wind generators of FIG. 1.

A flowchart of the DE algorithm 400, as applied to the pitch control problem, is shown in FIG. 4. The algorithm begins at step 102 by taking wind speed as input. The parameters to be optimized are the PI controller gains. Therefore D' is set to be equal to 2. At step 420, an initial population with NP=100 is generated by taking random values of $K_P$ and $K_I$ defined between the minimum and maximum values for these control parameters using equation (9).

Figure 6:
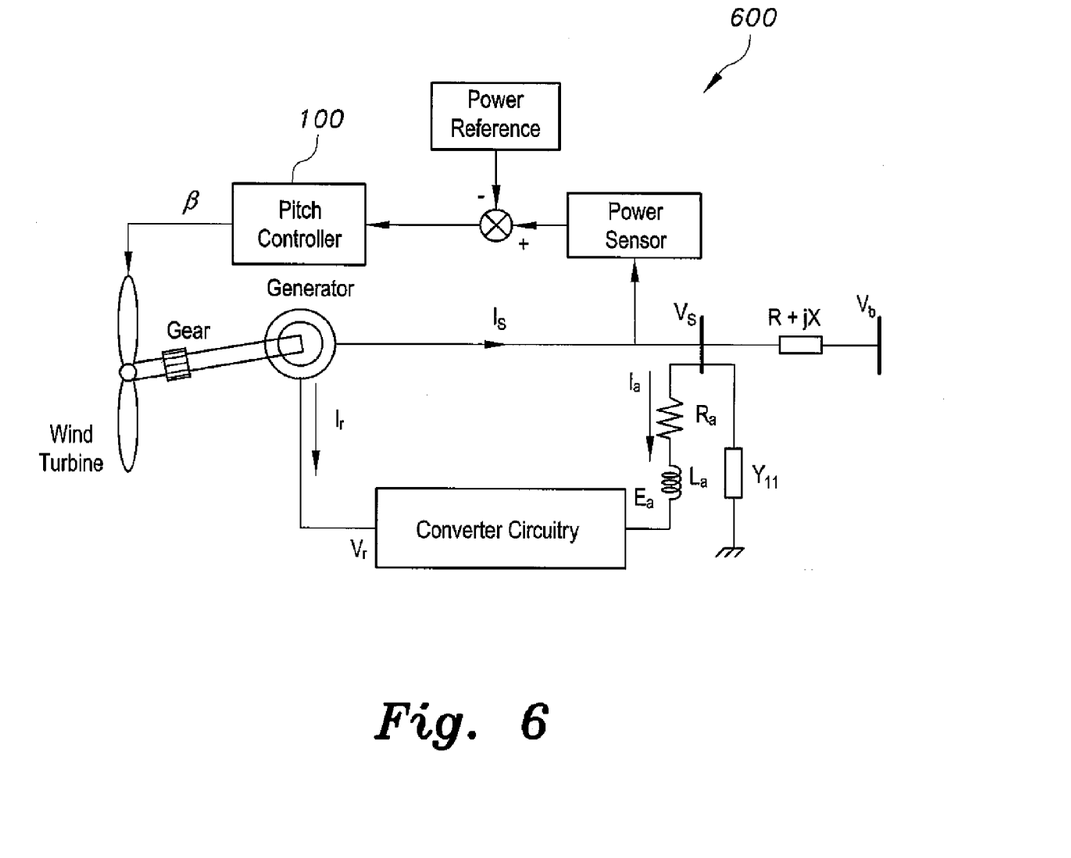
FIG. 6 is a block diagram showing a doubly fed induction generator equipped with an adaptive pitch control system for wind generators according to the present invention.

In order to diversify the search for the optimal solution, crossover and mutation functions are applied at step 430. At step 440, an objective function is then evaluated. At step 460, the selected values of controller parameters from step 450 are used to evaluate the eigenvalues of the closed loop matrix of equation (13). The closed loop matrix equation (13) is expressed using closed loop parameters defining state and instantaneous state changes of the DFIG system 600, shown in FIG. 6.

At step 462, DE will try to push all those eigenvalues that have damping ratio less than the preselected one to have the desired damping.

At step 464, trial and mutated vectors are formed using the crossover process illustrated in FIG. 3. The new population formed through this process is arranged in an ascending order of their objective function values. At step 466, a check is carried out to see whether the objective function is minimized or not. At step 468, if the objective function is minimized, then the resultant control parameters constitute an optimal solution. Otherwise, the algorithm continues until the desired parameters are achieved. The optimal values of $K_P$ and $K_I$ are captured at step 470, and the procedure ends at step 472.

The processing flow 500 (shown in FIG. 5) of the present adaptive neural network will, at initial conditions operating at one wind speed, (1) find out the reference power from a reference table or curve set describing mechanical power at an initial pitch angle β and rotor speed; and (2) the reference neural network model computes the optimum $K_P$ and $K_I$ for the PI controller at that wind speed according to the adaptive neural network 106, shown in FIG. 1. The neural network procedure makes use of the back propagation algorithm to accomplish computation of the PI controller's $K_P$ and $K_I$. The weights of this neural network are fixed. Finally, (3) the system states are evaluated from the linearized model given in equation (13). This involves making use of the initial conditions of the DFIG.

Figure 5:
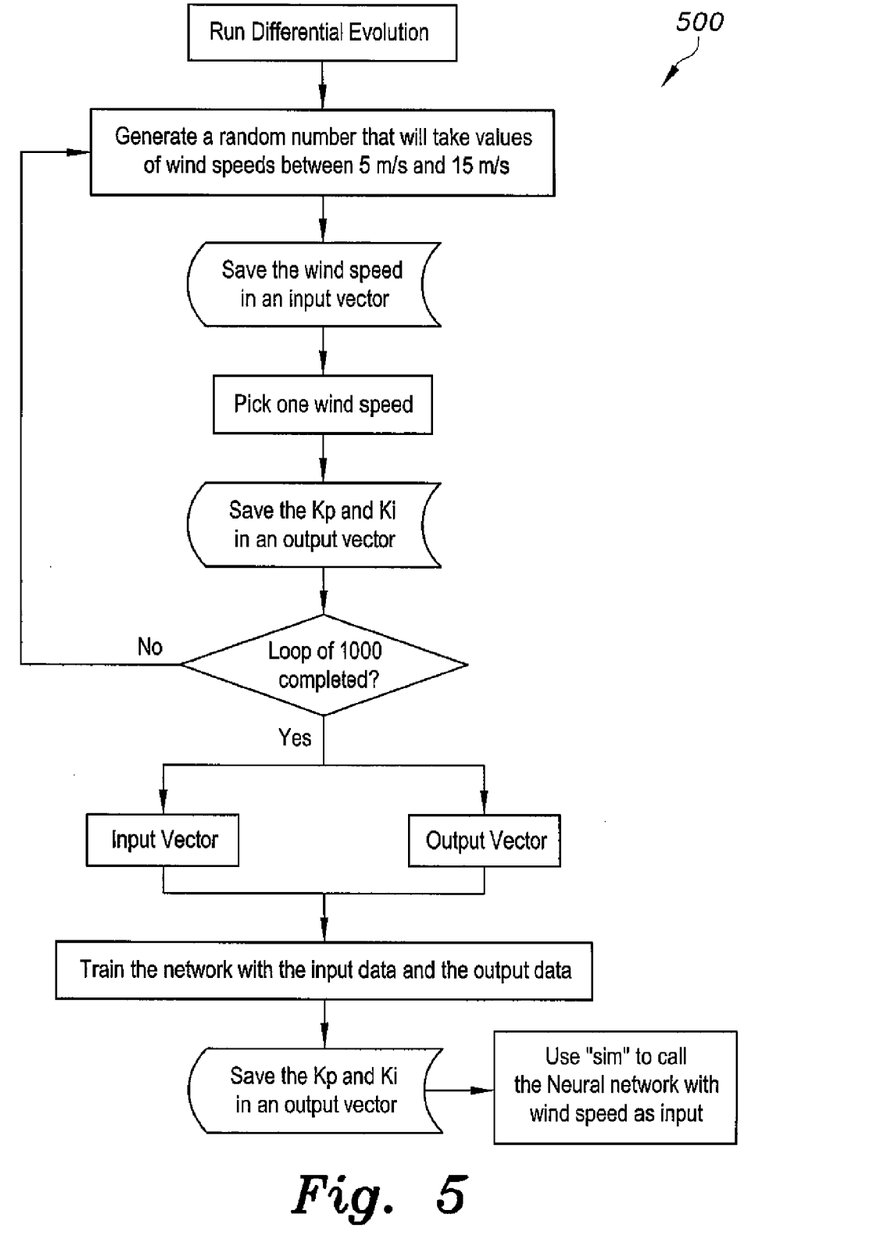
FIG. 5 is a detailed flowchart of the neural network computations for the adaptive pitch control system for wind generators of FIG. 1.

In case of wind speed disturbance, the neural network adapts weights. (1) The reference model generates a new optimum $K_P$ and $K_I$. (2) The system states are varied according to the disturbance. (3) By setting the new optimum $K_P$ and $K_I$ as the targets and also making use of limits for generator speed and terminal voltage variation, the weights of the adaptive neural network are adapted using a steepest descent procedure, as known in the art. (4) The new generated $K_P$ and $K_I$ are applied to the system to come up with an optimized value for the pitch control β.

The present smart pitch controller, which adjusts its parameters depending on the variation of wind speed, uses a back propagation neural network backed by a highly efficient adaptive evolutionary technique. The neural network uses the nonlinear dynamic model of the DFIG wind generation system, while the DEIT uses the quasi-linearized model for computational efficiency. Simulation results clearly show the effectiveness of the proposed smart control in transferring the wind power to the grid through the doubly fed generator smoothly and with very little transients. While the background work requires some computational effort, the controllers can be tuned adaptively with varying wind speed.

It is to be understood that the present invention is not limited to the embodiments described above, but encompasses any and all embodiments within the scope of the following claims.

We claim:

1. An adaptive pitch control system for a wind generator, the wind generator being a doubly fed induction generator (DFIG) having blade pitch servos for adjusting blade pitch of the DFIG wind generator, the system comprising:

means for determining a theoretically maximum reference power of the wind generator based on rotor speed and a plurality of given pitch angles;

a proportional-integral (PI) pitch controller having an input, a proportional gain constant $K_P$, an integral gain constant $K_I$, and an output adapted for connection to the blade pitch servos, the PI pitch controller output including means for sending pitch angle commands $\beta$ to the blade pitch servos to control pitch angle of the blades;

a back propagation neural network (BPNN) having a plurality of signal paths and a corresponding plurality of weights applied to said plurality of signal paths, said back propagation neural network being in communication with said PI controller;

means for feeding back system states of the wind generator to said PI pitch controller;

means for tuning said plurality of weights based on said feedback of said system states, wherein said means for tuning said plurality of weights comprises means for generating a training dataset applied to said BPNN;

means for determining actual power output of the wind generator;

means for determining the difference between the actual power output of the wind generator and the theoretically maximum reference power, the difference resulting in an error power signal;

means for applying said error power signal to the PI pitch controller input;

means for additively combining the $K_p$ multiplied by the error power signal with the $K_I$ multiplied by a time integral of the error power signal, the additive combination means forming the PT pitch controller output of the pitch angle commands $\beta$;

means for adaptively adjusting the $K_p$ and the $K_I$ based on the error power signal;

means for generating a random number having values of said wind speeds between a first predetermined wind speed and a second predetermined wind speed to define a randomly generated wind speed;

means for saving the randomly generated wind speed in an input vector;

means for picking a wind speed from the input vector;

means for generating said $K_p$ and said $K_I$ for the input vector wind speed;

means for saving said $K_p$ and said $K_I$ in an output vector; and means for collecting a predetermined number of values in the input vector and the output vector, the input vector and the output vector forming said neural network training dataset used to train said back propagation neural network.

2. The adaptive pitch control system for a DFIG wind generator according to claim 1, wherein said means for generating said training dataset further comprises evolutionary computation means for optimizing said $K_p$ and said $K_I$.

3. The adaptive pitch control system for a DFIG wind generator according to claim 2, wherein said evolutionary computation means for optimizing said $K_p$ and said $K_I$ comprises:

means for inputting said wind speed;

means for generating an initial population having a predetermined size by taking said random values of said $K_p$ and said $K_I$ defined between said first and second predetermined wind speeds;

means for applying crossover and mutation to said $K_p$ and said $K_I$ values;

means for evaluating an objective function of said $K_p$ and said $K_I$ values, said objective function expressing a difference in damping ratio obtained from dominant eigenvalues in a closed loop $\alpha$-matrix defining states and instantaneous state changes of said DFIG wind generator;

means for selecting said $K_p$ and said $K_I$ values based on said objective function evaluation means;

means for pushing said Eigen values until a required damping is reached;

means for generating a trial vector and a mutated vector therefrom;

means for extracting values of said $K_p$ and said $K_I$ based on a minimum of said objective function;

means for iterating through said objective function evaluation, Eigen evaluation, Eigenvalues pushing, trial vector generation, $K_p$ and said $K_I$ value extraction until said objective function has reached its minimum value; and means for updating said output vectors with optimized values of said $K_p$ and said $K_I$.

4. The adaptive pitch control system for a DFIG wind generator according to claim 3, wherein said DFIG system states include direct and quadrature stator and rotor currents, direct and quadrature converter currents, turbine and generator speeds, torsion angle, initial and current pitch angle, and DC link capacitor voltage, said instantaneous state changes being represented by said closed loop $\alpha$-matrix multiplied by said DFIG states.

5. The adaptive pitch control system for a DFIG wind generator according to claim 4, wherein said BPNN further comprises means for performing an approximate steepest descent on said weights when an error difference exists between said $K_I$ and $K_p$ gain constants of said output vector and said $K_I$ and $K_p$ gain constants output by said BPNN.

* * * * *